(12) United States Patent
Chu et al.

(10) Patent No.: US 12,438,434 B2
(45) Date of Patent: Oct. 7, 2025

(54) VOLTAGE CONVERTER AND ADJUSTMENT METHOD CAPABLE OF ADJUSTING ZERO-CROSSING REFERENCE CURRENT

(71) Applicant: PowerX Semiconductor Corporation, Hsinchu County (TW)

(72) Inventors: Hung-Yuan Chu, Hsinchu County (TW); Chen-Wei Yeh, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 299 days.

(21) Appl. No.: 18/451,831

(22) Filed: Aug. 17, 2023

(65) Prior Publication Data
US 2024/0313633 A1    Sep. 19, 2024

(30) Foreign Application Priority Data
Mar. 14, 2023    (TW) .................. 112109410

(51) Int. Cl.
*H02M 1/00*    (2007.01)
*H02M 1/08*    (2006.01)
(Continued)

(52) U.S. Cl.
CPC ....... *H02M 1/0025* (2021.05); *H02M 1/0009* (2021.05); *H02M 1/083* (2013.01);
(Continued)

(58) Field of Classification Search
CPC .. H02M 1/0009; H02M 1/0025; H02M 1/083; H02M 1/0054; H02M 3/155; H02M 3/156; H02M 3/158; H02M 3/1588
See application file for complete search history.

(56) References Cited

U.S. PATENT DOCUMENTS 7,652,945 B2    1/2010  Chu et al.
8,786,267 B2    7/2014  Lu et al.
(Continued)

FOREIGN PATENT DOCUMENTS

CN    1736018 A    2/2006
CN    101534053 A    9/2009
(Continued)

*Primary Examiner* — Sean Kayes
*Assistant Examiner* — Jennifer C Caulk
(74) *Attorney, Agent, or Firm* — CKC & Partners Co., LLC

(57) ABSTRACT

A voltage converter capable of adjusting a zero-crossing reference current includes a first power switch, a second power switch, a current sensor circuit, a zero-crossing reference current source, and an adjustment circuit. The first power switch and the second power switch are coupled in series to generate an inductor current. The current sensor circuit is coupled to the second power switch to sense a current flowing through the second power switch and generate a sensing current. The zero-crossing reference current source outputs a zero-crossing reference current. The adjustment circuit is coupled to the current sensor circuit and the zero-crossing reference current source to receive the sensing current and the zero-crossing reference current, so as to control the second power switch and adjust the zero-crossing reference current according to the sensing current and the zero-crossing reference current.

20 Claims, 6 Drawing Sheets

(51) Int. Cl.
*H02M 3/155* (2006.01)
*H02M 3/156* (2006.01)
*H02M 3/158* (2006.01)

(52) U.S. Cl.
CPC ........... *H02M 3/155* (2013.01); *H02M 3/156* (2013.01); *H02M 3/158* (2013.01); *H02M 3/1588* (2013.01)

(56) References Cited

U.S. PATENT DOCUMENTS

| | | | |
|---|---|---|---|
| 9,240,712 | B2 | 1/2016 | Chandrasekaran |
| 9,257,908 | B2 | 2/2016 | Thompson et al. |
| 9,444,441 | B2 | 9/2016 | Hou et al. |
| 9,692,296 | B1 | 6/2017 | Dash et al. |
| 10,122,256 | B1 | 11/2018 | Babazadeh et al. |
| 2008/0246455 | A1 | 10/2008 | Chu et al. |
| 2014/0253083 | A1* | 9/2014 | Shao ........................ H02M 1/32 323/285 |
| 2014/0253089 | A1* | 9/2014 | Qin ........................ H02M 3/158 323/312 |
| 2015/0180339 | A1* | 6/2015 | Chen ...................... H02M 3/156 323/235 |
| 2016/0276936 | A1* | 9/2016 | Gritti .................. H02M 1/4258 |
| 2016/0322900 | A1 | 11/2016 | Xu |
| 2017/0294839 | A1* | 10/2017 | de Cremoux ......... H02M 3/157 |
| 2018/0004240 | A1* | 1/2018 | Gritti ....................... G05F 3/26 |

FOREIGN PATENT DOCUMENTS

| | | |
|---|---|---|
| TW | 200827969 A | 7/2008 |
| TW | 201428444 A | 7/2014 |
| TW | M642139 U | 6/2023 |
| WO | 2021/171769 A1 | 9/2021 |

\* cited by examiner

VOLTAGE CONVERTER AND ADJUSTMENT METHOD CAPABLE OF ADJUSTING ZERO-CROSSING REFERENCE CURRENT

RELATED APPLICATIONS

This application claims priority to Taiwanese Application Serial Number 112109410, filed Mar. 14, 2023, which is herein incorporated by reference.

BACKGROUND

Technical Field

The present disclosure relates to zero-crossing adjustments technology. More particularly, the present disclosure relates to a voltage converter and an adjustment method capable of adjusting zero-crossing reference current.

Description of Related Art

With the progress of technologies, various integrated circuits are developed. For example, power switches in a voltage converter can provide an inductor current to its output terminal to supply power to back-end circuits. However, when a reverse-flow event of the inductor current occurs, efficiency of the voltage converter becomes worse.

SUMMARY

Some aspects of the present disclosure are to provide a voltage converter capable of adjusting a zero-crossing reference current. The voltage converter includes a first power switch, a second power switch, a current sensor circuit, a zero-crossing reference current source, and an adjustment circuit. The first power switch and the second power switch are coupled in series to generate an inductor current. The current sensor circuit is coupled to the second power switch to sense a current flowing through the second power switch and generate a sensing current. The zero-crossing reference current source is configured to output a zero-crossing reference current. The adjustment circuit is coupled to the current sensor circuit and the zero-crossing reference current source to receive the sensing current and the zero-crossing reference current, so as to control the second power switch and adjust the zero-crossing reference current according to the sensing current and the zero-crossing reference current.

Some aspects of the present disclosure are to provide an adjustment method capable of adjusting a zero-crossing reference current. The adjustment method includes following operations: generating, by a first power switch and a second power switch, an inductor current; sensing, by a current sensor circuit, a current flowing through the second power switch to generate a sensing current; outputting, by a zero-crossing reference current source, a zero-crossing reference current; and controlling, by an adjustment circuit, the second power switch and adjusting the zero-crossing reference current according to the sensing current and the zero-crossing reference current.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
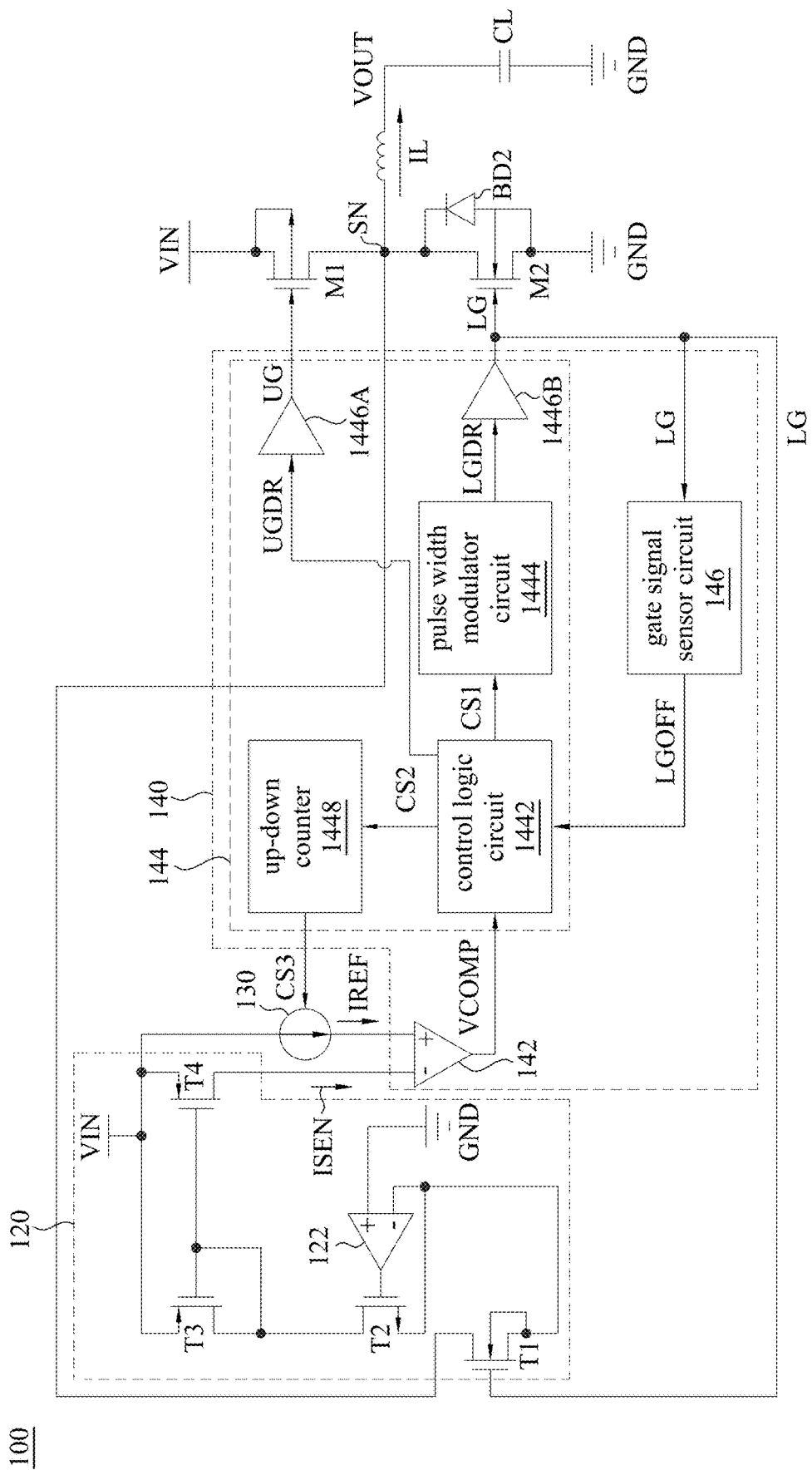
FIG. 1 is a schematic diagram of a voltage converter capable of adjusting a zero-crossing reference current according to some embodiments of the present disclosure.

Reference is made to FIG. 1. FIG. 1 is a schematic diagram of a voltage converter 100 capable of adjusting a zero-crossing reference current according to some embodiments of the present disclosure.

As illustrated in FIG. 1, the voltage converter 100 includes a power switch M1, a power switch M2, a current sensor circuit 120, a zero-crossing reference current source 130, and an adjustment circuit 140.

The power switch M1 and the power switch M2 are coupled in series and are controlled by a control circuit 144 to generate an inductor current IL so as to generate an output voltage VOUT. To be more specific, the power switch M1 is coupled between an input voltage VIN and a switching node SN. The power switch M2 is coupled between the switching node SN and a ground terminal GND. A voltage at a first terminal of a capacitor CL is the output voltage VOUT, and a second terminal of the capacitor CL is coupled to the ground terminal GND.

The current sensor circuit 120 is coupled to the switching node SN (or a drain terminal of the power switch M2) to sense a current flowing through the power switch M2 and generate a sensing current ISEN.

As illustrated in FIG. 1, the current sensor circuit 120 includes a transistor T1, a transistor T2, a transistor T3, a transistor T4, and an amplifier 122. A drain terminal of the transistor T1 is coupled to the switching node SN (or the drain terminal of the power switch M2). A gate terminal of the transistor T1 is coupled to a gate terminal of the power switch M2. A source terminal of the transistor T1 is coupled to a negative input terminal of the amplifier 122. A positive input terminal of the amplifier 122 is coupled to the ground terminal GND. An output terminal of the amplifier 122 is coupled to a gate terminal of the transistor T2. A source terminal of the transistor T2 is coupled to the source terminal of the transistor T1. A drain terminal of the transistor T2 is coupled to a drain terminal of the transistor T3. A gate terminal of the transistor T3 is coupled to the drain terminal of the transistor T3 and a gate terminal of the transistor T4. A source terminal of the transistor T3 is coupled to a source terminal of the transistor T4. A drain terminal of the transistor T4 is coupled to the negative input terminal of the comparator 142.

The amplifier 122 and the transistor T2 can lock a voltage of the source terminal of the transistor T1 at a ground voltage of the ground terminal GND. In other words, three voltages at three terminals of the transistor T1 (i.e., a voltage at the switching node SN, a voltage of the gate signal LG, and the ground voltage of the ground terminal GND) are the same as three voltages at three respective terminals of the power switch M2 (i.e., the voltage at the switching node SN, the voltage of the gate signal LG, and the ground voltage of the ground terminal GND). Accordingly, the ratio of the current flowing through the transistor T1 to the current flowing through the power switch M2 is positively proportional to a ratio of a size of the transistor T1 to a size of the power switch M2. The "size" here may refer to a gate width of a transistor or a switch. For example, when the ratio of the gate width of the transistor T1 to the gate width of the power switch M2 is 1:1000, the ratio of the current flowing through the transistor T1 to the current flowing through the power switch M2 is 1:1000.

Then, with a current mirror formed by the transistor T3 and the transistor T4, the sensing current ISEN is generated according to a current flowing through the transistor T3 (i.e., the current flowing through the transistor T1). For example, the sensing current ISEN is equal to the current flowing through the transistor T3 (i.e., the current flowing through the transistor T1).

The implementation of the current sensor circuit 120 in FIG. 1 is merely for illustration, and the present disclosure is not limited thereto. Various potential implementations are within the scope of the present disclosure.

The zero-crossing reference current source 130 is coupled to the current sensor circuit 120 and the adjustment circuit 140. The zero-crossing reference current source 130 can output a zero-crossing reference current IREF. Various potential implementations of the zero-crossing reference current source 130 are within the scope of the present disclosure.

The adjustment circuit 140 is coupled to the current sensor circuit 120, the zero-crossing reference current source 130, and the power switch M2. The adjustment circuit 140 can receive the sensing current ISEN and the zero-crossing reference current IREF to control the power switch M2 according to the sensing current ISEN and the zero-crossing reference current IREF and adjust the zero-crossing reference current IREF.

As illustrated in FIG. 1, the adjustment circuit 140 includes a comparator 142, a control circuit 144, and a gate signal sensor circuit 146.

A positive input terminal of the comparator 142 is coupled to the zero-crossing reference current source 130 to receive the zero-crossing reference current IREF. A negative input terminal of the comparator 142 is coupled to the current sensor circuit 120 to receive the sensing current ISEN. The comparator 142 compares the zero-crossing reference current IREF with the sensing current ISEN to output a comparison voltage VCOMP at its output terminal. When the sensing current ISEN is less than the zero-crossing reference current IREF, the comparison voltage VCOMP has a high logic value (e.g., the logic value 1). When the sensing current ISEN is greater than the zero-crossing reference current IREF, the comparison voltage VCOMP has a low logic value (e.g., the logic value 0).

The control circuit 144 is coupled to the output terminal of the comparator 142 to receive the comparison voltage VCOMP. As illustrated in FIG. 1, the control circuit 144 includes a control logic circuit 1442, a pulse width modulator circuit 1444, a driver 1446A, a driver 1446B, and an up-down counter 1448. The control logic circuit 1442 provides a driving signal UGDR. The driver 1446A is coupled to the control logic circuit 1442 to receive the driving signal UGDR and generate a gate signal UG according to the driving signal UGDR. The gate signal UG is transmitted to a gate terminal of the power switch M1 to turn on or turn off the power switch M1. The control logic circuit 1442 is further coupled to the output terminal of the comparator 142 to receive the comparison voltage VCOMP and generate a control signal CS1 according to the comparison voltage VCOMP. The pulse width modulator circuit 1444 is coupled to the control logic circuit 1442 to receive the control signal CS1 and generate a driving signal LGDR according to the control signal CS1. The driver 1446B is coupled to the pulse width modulator circuit 1444 to receive the driving signal LGDR and generate a gate signal LG according to the driving signal LGDR. The gate signal LG is transmitted to the gate terminal of the power switch M2 to turn on or turn off the power switch M2.

The gate signal sensor circuit 146 is coupled to an output terminal of the driver 1446B (i.e., the gate terminal of the power switch M2) to receive the gate signal LG and generate a turned-off sensing signal LGOFF according to the gate signal LG. The control logic circuit 1442 is coupled to the gate signal sensor circuit 146 to receive the turned-off sensing signal LGOFF and generate a control signal CS2 according to the turned-off sensing signal LGOFF and the comparison voltage VCOMP.

The up-down counter 1448 is coupled to the control logic circuit 1442 to receive the control signal CS2, and is coupled to the zero-crossing reference current source 130 to generate a control signal CS3 according to the control signal CS2. The up-down counter 1448 transmits the control signal CS3 to the zero-crossing reference current source 130 to adjust the zero-crossing reference current IREF.

In some embodiments, the control logic circuit 1442, the pulse width modulator circuit 1444, the up-down counter 1448, the gate signal sensor circuit 1446, or parts other than inductors or capacitors can be implemented with Application Specific Integrated Circuits (ASICs).

Figure 2:
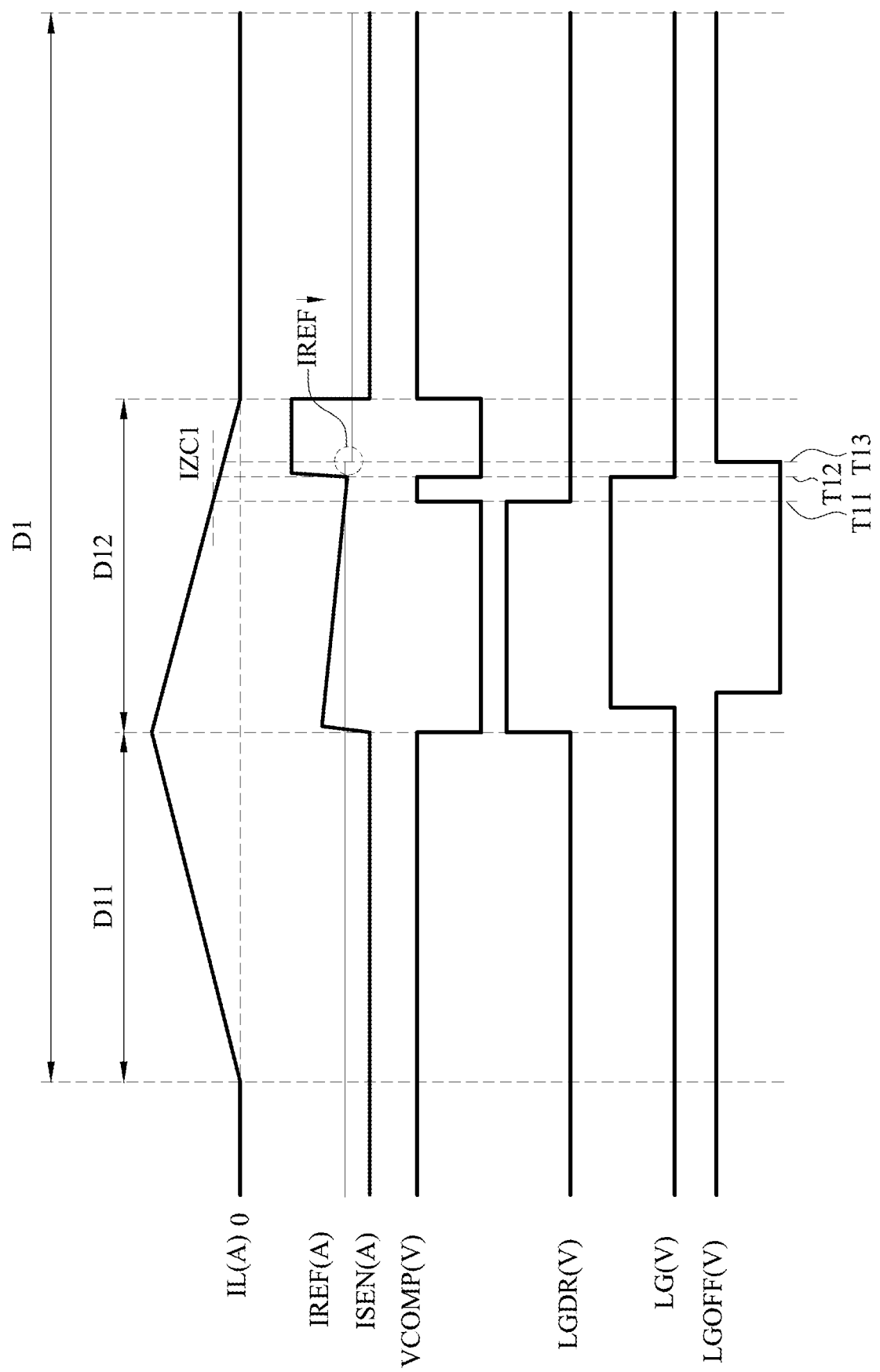
FIG. 2 is a timing diagram of a period of the voltage converter in FIG. 1 according to some embodiments of the present disclosure.
Figure 3:
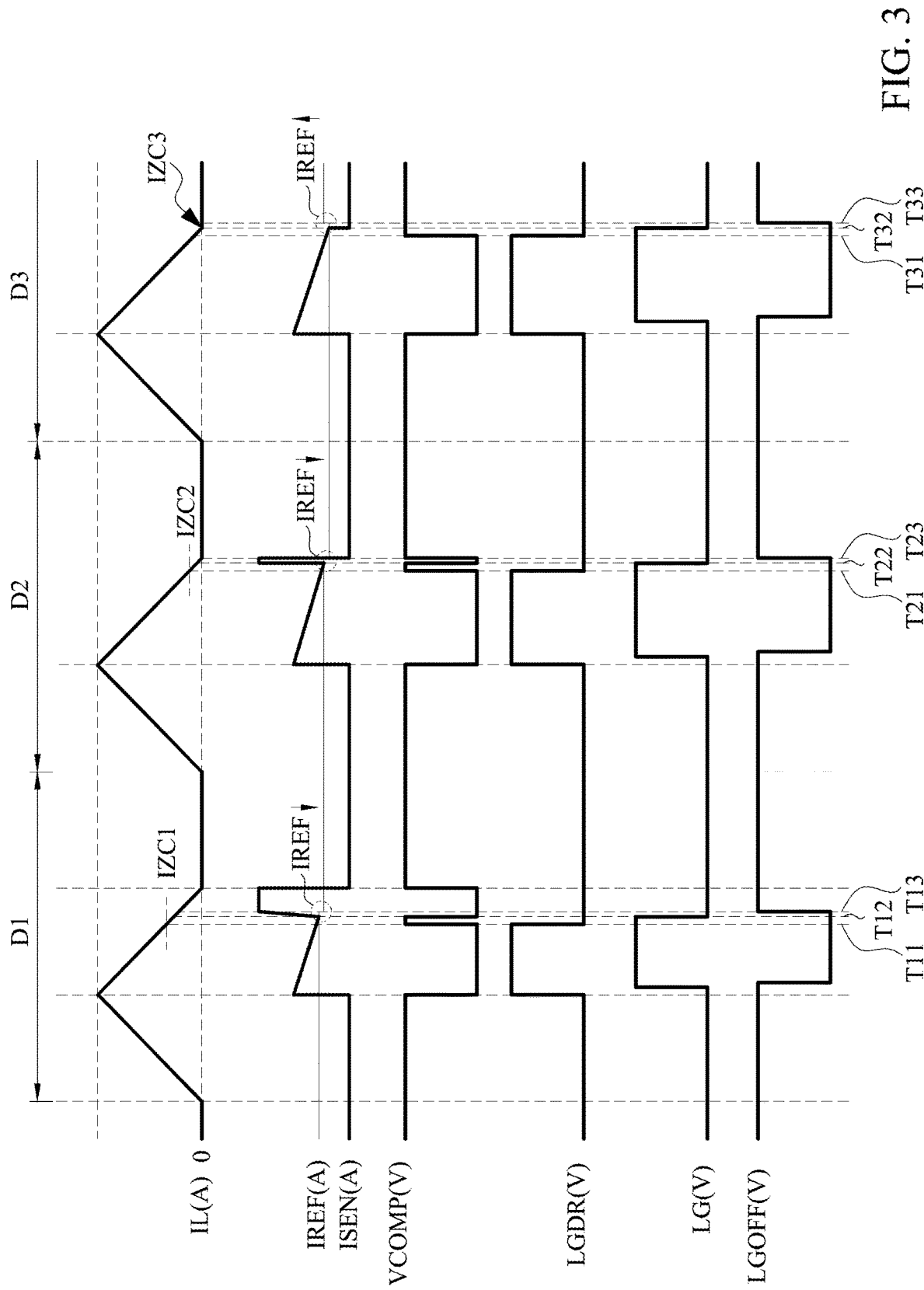
FIG. 3 is a timing diagram of a plurality of periods of the voltage converter in FIG. 1 according to some embodiments of the present disclosure.

FIG. 2 is a timing diagram of a period D1 of the voltage converter in FIG. 1 according to some embodiments of the present disclosure. FIG. 3 is a timing diagram of a plurality of periods D1-D3 of the voltage converter in FIG. 1 according to some embodiments of the present disclosure.

References are made to FIG. 1 and FIG. 2. The period D1 includes a time duration D11 and a time duration D12. In the time duration D11, the power switch M1 is turned on and the power switch M2 is turned off, and thus the inductor current IL increases gradually. In the time duration D12, the power switch M1 is turned off and the power switch M2 is turned on, and thus the inductor current IL decreases gradually.

As illustrated in FIG. 2, there are a time point T11, a time point T12, and a time point T13 sequentially in the time duration D12.

From the time point T11 to the time point T12, when the sensing current ISEN is equal to (or less than) the zero-crossing reference current IREF, the inductor current IL is equal to (or lower than) a level of a zero-crossing point IZC1. In general, the zero-crossing point IZC1 is preferably closer to a zero current value. When a zero-crossing event occurs, a reverse-flow event of the inductor current IL may occur. When the reverse-flow event of the inductor current IL occurs, efficiency of the voltage converter 100 becomes worse. Accordingly, when the zero-crossing point IZC1 is closer to the zero current value, the zero-crossing protection can be activated more accurately (as the power switch M2 is turned off to avoid reverse-flow). Since the sensing current ISEN is equal to or less than the zero-crossing reference current IREF, the comparison voltage VCOMP outputted from the comparator 142 changes from a low logic value to a high logic value. In response to the comparison voltage VCOMP changing from the low logic value to a high logic value, the control logic circuit 1442 outputs the control signal CS1. In response to the control signal CS1, the driving signal LGDR outputted from the pulse width modulator circuit 1444 changes from a high logic value to a low logic value. At this moment, the inductor current IL and the sensing current ISEN continues to decrease.

At the time point T12, in response to the driving signal LGDR changing from the high logic value to the low logic value and based on the circuit delay of the driver 1446B, the gate signal LG outputted from the driver 1446B changes from a high logic value to a low logic value. Accordingly, the power switch M2 is turned off by the gate signal LG. At this moment, since the inductor current IL is greater than zero and the power switch M1 is turned off in the time duration D12, the inductor current IL flows from the ground terminal GND, through a body diode BD2 of the power switch M2 and the capacitor CL, to the ground terminal GND (forming a continuous flow). However, since the inductor current IL flows through the body diode BD2 of the power switch M2, the sensing current ISEN increases and is greater than the zero-crossing reference current IREF. Accordingly, the comparison voltage VCOMP outputted from the comparator 142 changes from a high logic value to a low logic value.

At the time point T13, the gate signal sensor circuit 146 senses that the gate signal LG becomes the low logic value completely (the power switch M2 is turned off completely). Accordingly, the turned-off sensing signal LGOFF outputted from the gate signal sensor circuit 146 changes from the low logic value to the high logic value. When the turned-off sensing signal LGOFF has the high logic value, the control logic circuit 1442 confirms the logic value of the comparison voltage VCOMP. At this moment, the comparison voltage VCOMP has the low logic value, and it represents that the inductor current IL flows through the body diode BD2 of the power switch M2. Accordingly, the control logic circuit 1442 outputs the control signal CS2 to control the up-down counter 1448 to output the control signal CS3 so as to reduce the zero-crossing reference current IREF such that a level of a zero-crossing point in a next period becomes lower. As shown in FIG. 3, the level of the zero-crossing point IZC2 in the later period D2 in FIG. 3 is lower than the level of the zero-crossing point IZC1 in the period D1.

As illustrated in FIG. 3, there are a time point T21, a time point T22, and a time point T23 sequentially in the period D2. Operations of the time point T21, the time point T22, and the time point T23 are similar to operations of the time point T11, the time point T12, and the time point T13. That is, the control logic circuit 1442 outputs the control signal CS2 to control the up-down counter 1448 to reduce the zero-crossing reference current IREF again, such that the zero-crossing point in a next period becomes lower (e.g., a zero-crossing point IZC3 in the period D3 in FIG. 3 is lower than the zero-crossing point IZC2 in the period D2).

Then, there are a time point T31, a time point T32, and a time point T33 sequentially shown in the period D3. Similar to the time point T12 in the period D1 and the time point T22 in the period D2, the power switch M2 is turned off by the gate signal LG at the time point T32 in the period D3. At this moment, since the inductor current IL is equal to zero, the sensing current ISEN is less than the zero-crossing reference current IREF. Accordingly, the comparison voltage VCOMP outputted from the comparator 142 is kept at a high logic value.

Similar to the time point T13 in the period D1 and the time point T23 in the period D2, the gate signal sensor circuit 146 senses that the gate signal LG becomes a low logic value completely (which turns off the power switch M2 completely) at the time point T33 in the period D3. Accordingly, the turned-off sensing signal LGOFF outputted from the gate signal sensor circuit 146 changes from a low logic value to a high logic value. As described above, when the turned-off sensing signal LGOFF has the high logic value, the control logic circuit 1442 confirms the logic value of the comparison voltage VCOMP. At this moment, the comparison voltage VCOMP has the high logic value, and it represents that the inductor current IL does not flow through the body diode BD2 of the power switch M22. Accordingly, the control logic circuit 1442 outputs the control signal CS2 to control the up-down counter 1448 to output the control signal CS3 so as to increase the zero-crossing reference current IREF, such that the zero-crossing point in a next period becomes higher.

With the above operations, subsequent zero-crossing points can be very close to the time point of zero current value such that the zero-crossing protection can be activated at the time point of zero current value (e.g., turning off the power switch M2 to avoid a reverse flow). Accordingly, reverse-flowing of the inductor current IL can be avoided to maintain or improve the efficiency of the voltage converter 100.

In some related art approaches, the voltage at the switching node is sensed, and the sensed voltage and the zero-crossing voltages are utilized to perform the zero-crossing point detections or adjustments. In addition, these related approaches require two sets of comparators to perform the relevant zero-crossing point detections or adjustments.

Compared to the related art approaches above, the present disclosure utilizes the current sensor circuit 120 to sense the current flowing through the power switch M2 to generate the sensing current ISEN, so as to perform the zero-crossing adjustments. In particular, the current sensor circuit 120 generates the sensing current ISEN according to the voltages same to the three voltages at the three terminals of the power switch M2. In addition, the approach of the present disclosure only requires one set of the comparator 142 to perform the zero-crossing adjustments.

Figure 4:
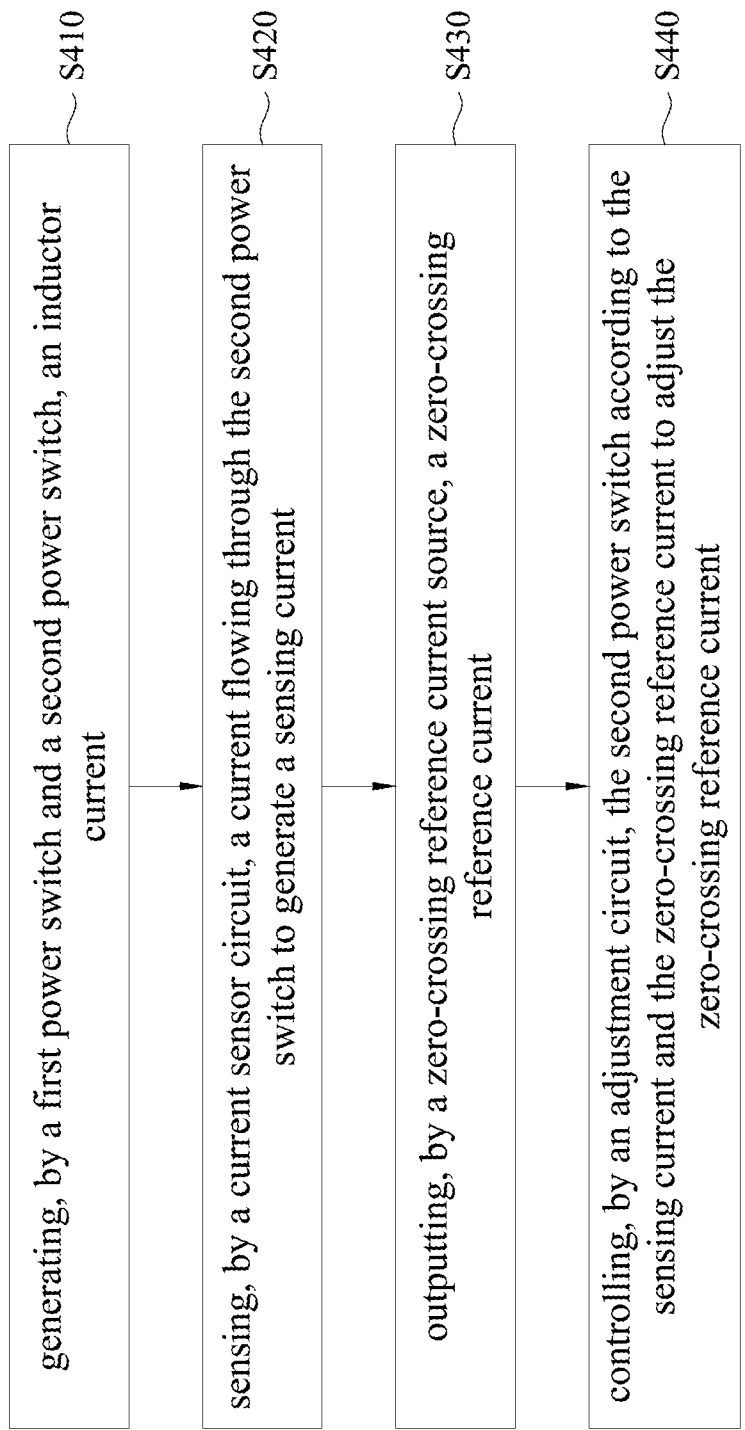
FIG. 4 is a flow diagram of an adjustment method according to some embodiments of the present disclosure.

Reference is made to FIG. 4. FIG. 4 is a flow diagram of an adjustment method 400 according to some embodiments of the present disclosure. In some embodiments, the adjustment method 400 can be applied to the voltage converter 100 in FIG. 1, the voltage converter 500 in FIG. 5, or the voltage converter 600 in FIG. 6, but the present disclosure is not limited thereto. For better understanding, the adjustment method 400 is described in following paragraphs in reference to FIG. 1.

The adjustment method 400 includes Operation S410, Operation S420, Operation S430, and Operation S440.

In Operation S410, the power switch M1 and the power switch M2 generate the inductor current IL.

In Operation S420, the current sensor circuit 120 senses the current flowing through the power switch M2 and generates the sensing current ISEN.

In Operation S430, the zero-crossing reference current source 130 outputs the zero-crossing reference current IREF.

In Operation S440, the adjustment circuit 140 controls the power switch M2 according to the sensing current ISEN and the zero-crossing reference current IREF and adjusts the zero-crossing reference current IREF.

The details about above operations S410-S440 are described in paragraphs related to FIG. 1, and thus they are not described herein again.

Figure 5:
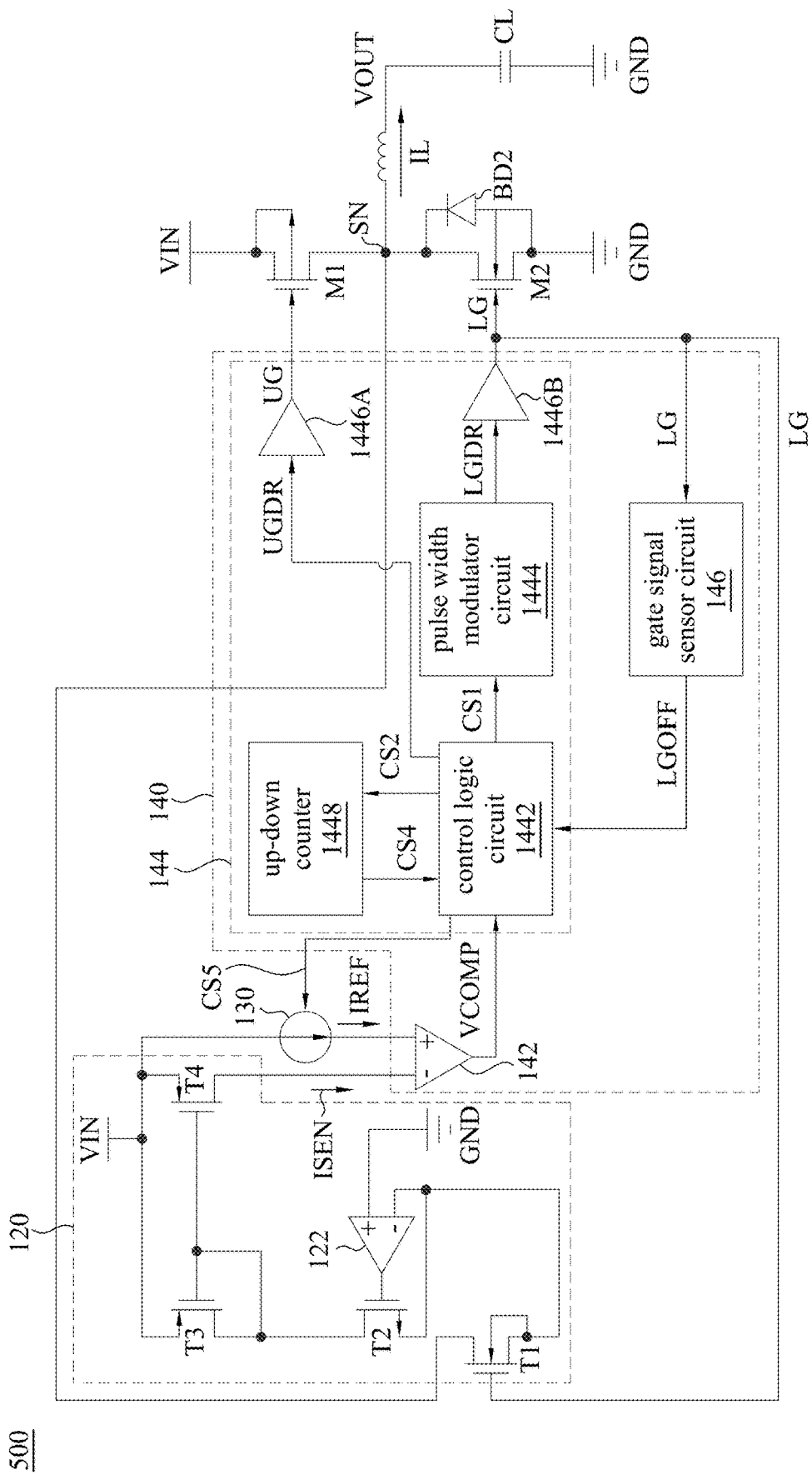
FIG. 5 is a schematic diagram of a voltage converter capable of adjusting a zero-crossing reference current according to some embodiments of the present disclosure.

Reference is made to FIG. 5. FIG. 5 is a schematic diagram of the voltage converter 500 capable of adjusting a zero-crossing reference current according to some embodiments of the present disclosure.

One of main differences between the voltage converter 500 and the voltage converter 100 in FIG. 1 is that, in the voltage converter 500, the up-down counter 1448 generates a control signal CS4 (e.g., with N bits) according to the control signal CS2 and transmits the control signal CS4 to the control logic circuit 1442. The control logic circuit 1442 generates a control signal CS5 (e.g., with N bits) according to the control signal CS4 and transmits the control signal CS5 to the zero-crossing reference current source 130 to adjust the zero-crossing reference current IREF. At this moment, the control signal CS5 is identical to the control signal CS4. In a steady state, the least significant bit of the control signal CS4 changes between bit 1 and bit 0. After a period of time, the control logic circuit 1442 latches the control signal CS5 and locks the least significant bit of the control signal CS5 to be bit 1. When the bits other than the least significant bit of the control signal CS4 change, the control logic circuit 1442 releases the latch of the control signal CS5 and directly transmits the control signal CS4 to be the control signal CS5 until entering a next steady state (the least significant bit of the control signal CS4 changes between bit 1 and bit 0).

Since other parts of the voltage converter 500 are similar to other parts of the voltage converter 100, they are not described herein again.

Figure 6:
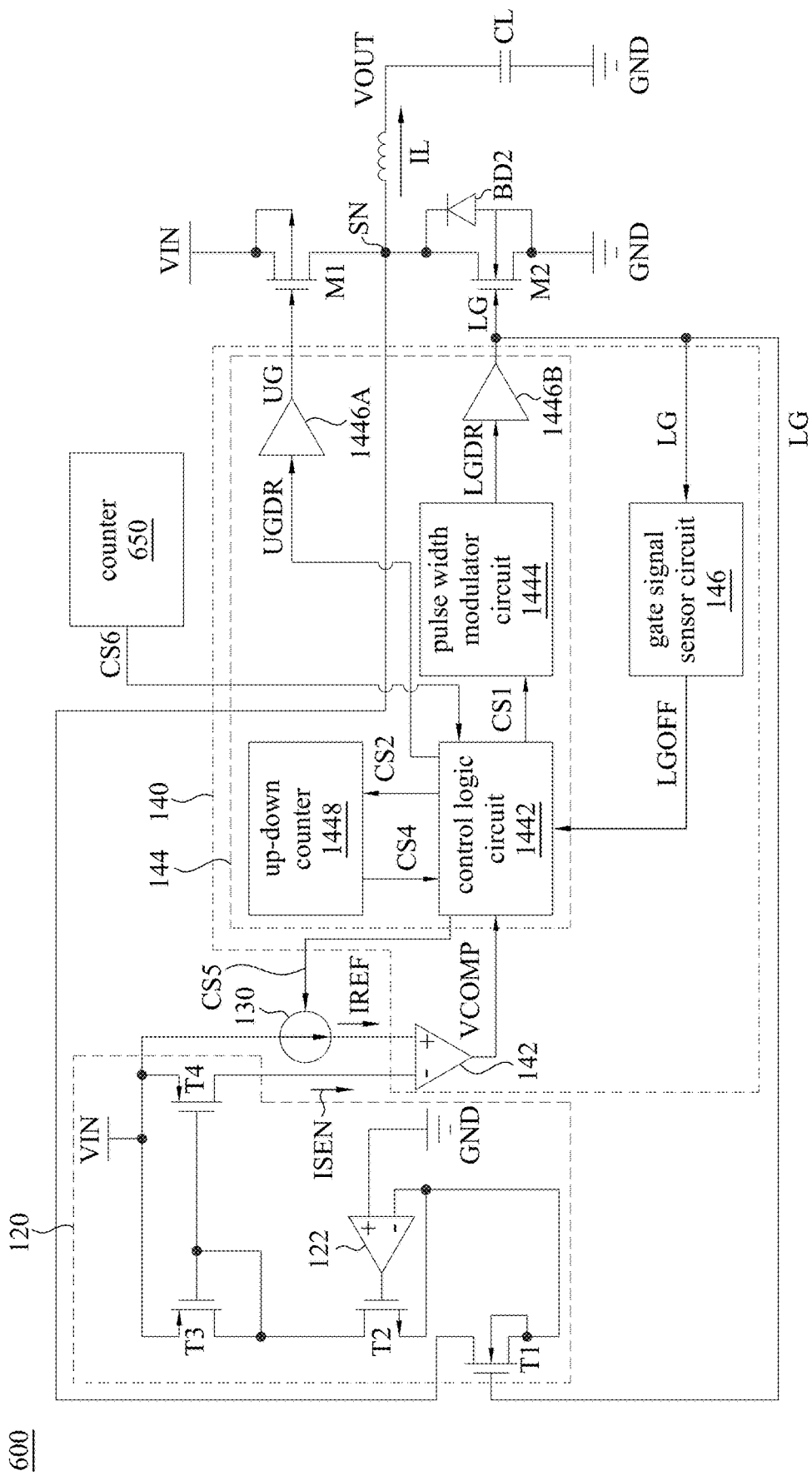
FIG. 6 is a schematic diagram of a voltage converter capable of adjusting a zero-crossing reference current according to some embodiments of the present disclosure.

Reference is made to FIG. 6. FIG. 6 is a schematic diagram of the voltage converter 600 capable of adjusting a zero-crossing reference current according to some embodiments of the present disclosure.

One of main differences between the voltage converter 600 and the voltage converter 500 in FIG. 5 is that, the voltage converter 600 further includes a counter 650. The counter 650 is coupled to the control logic circuit 1442. In some embodiments, the counter 650 can be a N-bits successive approximation register (SAR) counter. After the system is powered on, the control signal CS5 is identical to a control signal CS6. When the zero current is triggered for the first time, by the counter 650, it only takes N periods to find the steady control signal CS6 (some related art approaches require waiting for 2 to the Nth power to enter the steady state). Then, the control signal CS4 can be updated to be identical to the control signal CS6, and the control signal CS5 is latched by the control logic circuit 1442. At this moment, the least significant bit of the control signal CS4 changes between bit 1 and bit 0, and the remaining bits of the control signal CS4 are identical to corresponding bits of the control signal CS5. When the bits other than the least significant bit of the control signal CS4 change, the control logic circuit 1442 releases the latched control signal CS5 and directly transmits the control signal CS4 as an updated one of the control signal CS5 until a next steady state is entered (the least significant bit of the control signal CS4 changes between bit 1 and bit 0).

Since other parts of the voltage converter 600 are similar to other parts of the voltage converter 500, the details thereof are omitted here.

As described above, the voltage converter of the present disclosure can automatically adjust the zero-crossing reference current to accurately activate the zero-crossing protection (which turns off the power switch at the lower side) so as to avoid the reverse-flow of the inductor current.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A voltage converter capable of adjusting a zero-crossing reference current, comprising:
   a first power switch and a second power switch coupled in series to generate an inductor current;
   a current sensor circuit coupled to the second power switch to sense a current flowing through the second power switch, and generate a sensing current;
   a zero-crossing reference current source configured to output a zero-crossing reference current; and
   an adjustment circuit coupled to the current sensor circuit and the zero-crossing reference current source to receive the sensing current and the zero-crossing reference current so as to control the second power switch and adjust the zero-crossing reference current according to the sensing current and the zero-crossing reference current.

2. The voltage converter of claim 1, wherein the adjustment circuit comprises:
   a comparator coupled to the current sensor circuit and the zero-crossing reference current source to receive the sensing current and the zero-crossing reference current so as to generate a comparison voltage according to the sensing current and the zero-crossing reference current;
   a control circuit coupled to the comparator to receive the comparison voltage so as to generate a gate signal according to the comparison voltage and control the second power switch to be turned on or turned off; and
   a gate signal sensor circuit coupled to the control circuit to receive the gate signal so as to generate a turned-off sensing signal according to the gate signal, wherein the control circuit receives the turned-off sensing signal and the comparison voltage and the control circuit adjusts the zero-crossing reference current according to the turned-off sensing signal and the comparison voltage.

3. The voltage converter of claim 2, wherein the first power switch is coupled between an input voltage and a switching node, and the second power switch is coupled between the switching node and a ground terminal, wherein the current sensor circuit is coupled to the switching node and a gate terminal of the second power switch to generate the sensing current according to a voltage at the switching node, a voltage of the gate signal at the gate terminal, and a ground voltage at the ground terminal.

4. The voltage converter of claim 2, wherein the comparator comprises:
   a positive input terminal coupled to the zero-crossing reference current source to receive the zero-crossing reference current;
   a negative input terminal coupled to the current sensor circuit to receive the sensing current; and an output terminal configured to output the comparison voltage to the control circuit.

5. The voltage converter of claim 2, wherein the control circuit comprises:
 a control logic circuit coupled to the comparator to receive the comparison voltage so as to generate a first control signal according to the comparison voltage;
 a pulse width modulator circuit coupled to the control logic circuit to receive the first control signal so as to generate a driving signal according to the first control signal; and
 a driver coupled to the pulse width modulator circuit to receive the driving signal so as to generate the gate signal according to the driving signal.

6. The voltage converter of claim 5, wherein the control circuit further comprises:
 an up-down counter coupled to the control logic circuit and the zero-crossing reference current source to receive a second control signal which is generated by the control logic circuit according to the comparison voltage and the turned-off sensing signal so as to adjust the zero-crossing reference current according to the second control signal.

7. The voltage converter of claim 2, wherein when the sensing current is less than the zero-crossing reference current, the comparison voltage changes from a low logic value to a high logic value.

8. The voltage converter of claim 7, wherein in response to the comparison voltage changing from the low logic value to the high logic value, the gate signal changes from the high logic value to the low logic value to turn off the second power switch.

9. The voltage converter of claim 8, wherein in response to the gate signal changing from the high logic value to the low logic value, the turned-off sensing signal changes from the low logic value to the high logic value.

10. The voltage converter of claim 9, wherein in response to the turned-off sensing signal changing from the low logic value to the high logic value, the control circuit decreases the zero-crossing reference current when the comparison voltage has the low logic value,
 wherein in response to the turned-off sensing signal changing from the low logic value to the high logic value, the control circuit increases the zero-crossing reference current when the comparison voltage has the high logic value.

11. An adjustment method capable of adjusting a zero-crossing reference current, comprising:
 generating, by a first power switch and a second power switch, an inductor current;
 sensing, by a current sensor circuit, a current flowing through the second power switch to generate a sensing current;
 outputting, by a zero-crossing reference current source, a zero-crossing reference current; and
 controlling the second power switch and adjusting the zero-crossing reference current by an adjustment circuit according to the sensing current and the zero-crossing reference current.

12. The adjustment method of claim 11, wherein controlling the second power switch and adjusting the zero-crossing reference current by the adjustment circuit according to the sensing current and the zero-crossing reference current comprises:
 receiving, by a comparator in the adjustment circuit, the sensing current and the zero-crossing reference current to generate a comparison voltage according to the sensing current and the zero-crossing reference current;
 receiving, by a control circuit in the adjustment circuit, the comparison voltage to generate a gate signal according to the comparison voltage to turn on or turn off the second power switch;
 receiving, by a gate signal sensor circuit in the adjustment circuit, the gate signal to generate a turned-off sensing signal according to the gate signal; and
 receiving, by the control circuit, the turned-off sensing signal and the comparison voltage to adjust the zero-crossing reference current according to the turned-off sensing signal and the comparison voltage.

13. The adjustment method of claim 12, wherein sensing, by the current sensor circuit, the current flowing through the second power switch to generate the sensing current comprises:
 generating, by the current sensor circuit, the sensing current according to a voltage at a switching node between the first power switch and the second power switch, a voltage of the gate signal at a gate terminal of the second power switch, and a ground voltage at a ground terminal.

14. The adjustment method of claim 12, wherein receiving, by the comparator, the sensing current and the zero-crossing reference current to generate the comparison voltage according to the sensing current and the zero-crossing reference current comprises:
 receiving, by a positive input terminal of the comparator, the zero-crossing reference current;
 receiving, by a negative input terminal of the comparator, the sensing current; and
 outputting, by an output terminal of the comparator, the comparison voltage to the control circuit.

15. The adjustment method of claim 12, wherein receiving, by the control circuit, the comparison voltage to generate the gate signal according to the comparison voltage comprises:
 receiving, by a control logic circuit in the control circuit, the comparison voltage to generate a first control signal according to the comparison voltage;
 receiving, by a pulse width modulator circuit in the control circuit, the first control signal to generate a driving signal according to the first control signal; and
 receiving, by a driver in the control circuit, the driving signal to generate the gate signal according to the driving signal.

16. The adjustment method of claim 15, wherein receiving, by the control circuit, the turned-off sensing signal and the comparison voltage to adjust the zero-crossing reference current according to the turned-off sensing signal and the comparison voltage comprises:
 receiving, by an up-down counter in the control circuit, a second control signal which is generated by the control logic circuit according to the comparison voltage and the turned-off sensing signal, for adjusting the zero-crossing reference current according to the second control signal.

17. The adjustment method of claim 12, wherein when the sensing current is less than the zero-crossing reference current, the comparison voltage changes from a low logic value to a high logic value.

18. The adjustment method of claim 17, wherein in response to the comparison voltage changing from the low logic value to the high logic value, the gate signal changes from the high logic value to the low logic value to turn off the second power switch.

19. The adjustment method of claim 18, wherein in response to the gate signal changing from the high logic value to the low logic value, the turned-off sensing signal changes from the low logic value to the high logic value.

20. The adjustment method of claim 19, wherein in response to the turned-off sensing signal changing from the low logic value to the high logic value, the control circuit decreases the zero-crossing reference current when the comparison voltage has the low logic value, wherein in response to the turned-off sensing signal changing from the low logic value to the high logic value, the control circuit increases the zero-crossing reference current when the comparison voltage has the high logic value.

\* \* \* \* \*